No. 738,485. PATENTED SEPT. 8, 1903.
F. N. ROGERS, R. K. HUMPHREY & J. W. NESMITH.
VIBRATING SCREEN.
APPLICATION FILED JAN. 18, 1902.
NO MODEL. 3 SHEETS—SHEET 1.
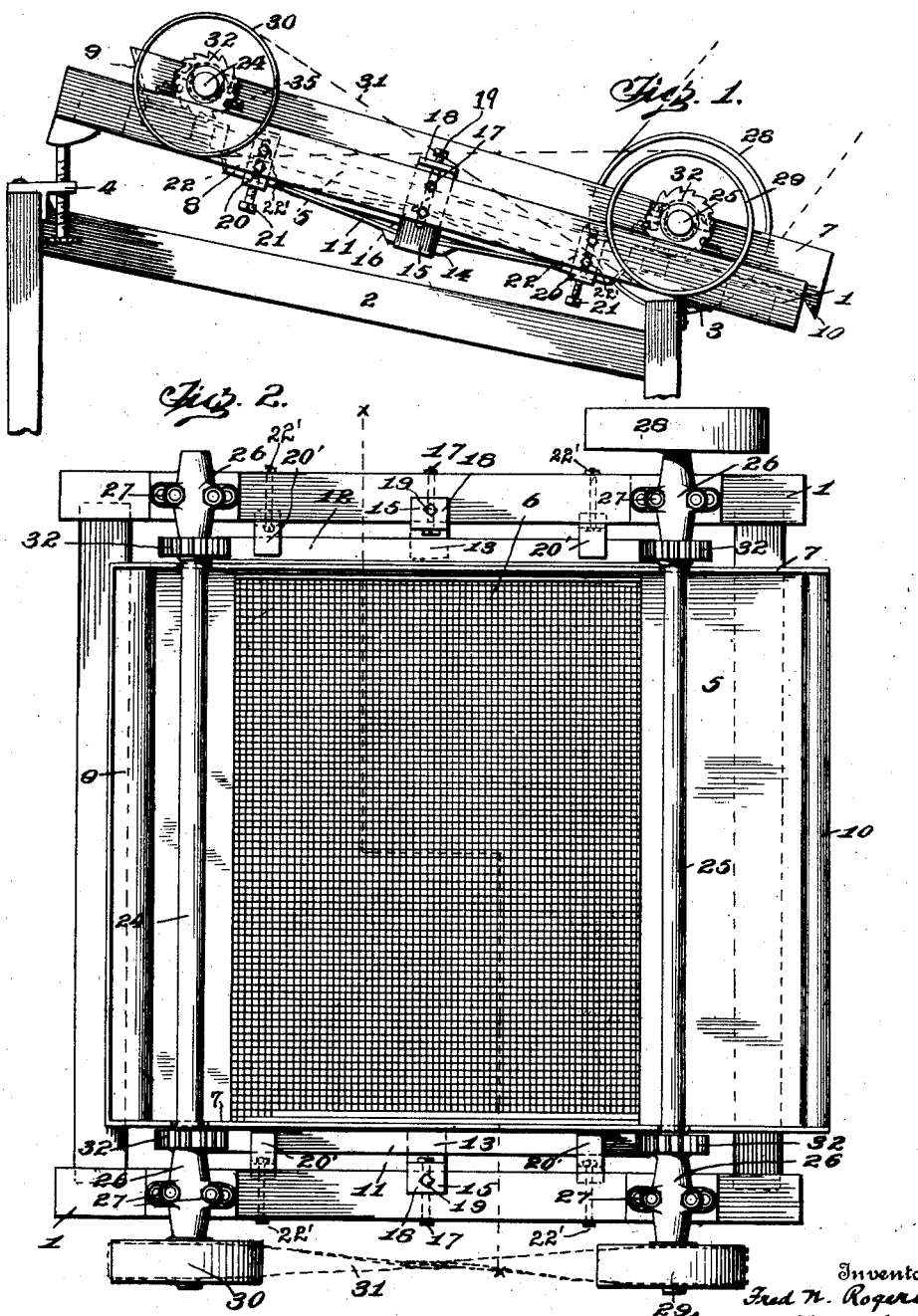

No. 738,485. PATENTED SEPT. 8, 1903.
F. N. ROGERS, R. K. HUMPHREY & J. W. NESMITH.
VIBRATING SCREEN.
APPLICATION FILED JAN. 18, 1902.
NO MODEL. 3 SHEETS—SHEET 2.
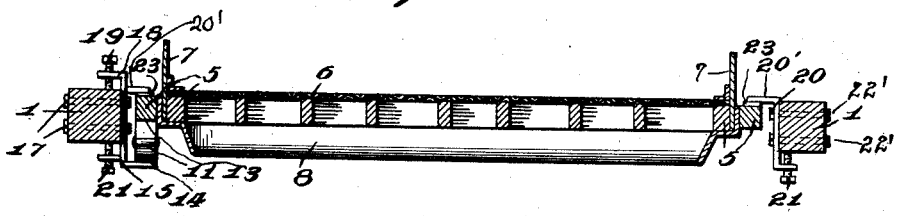
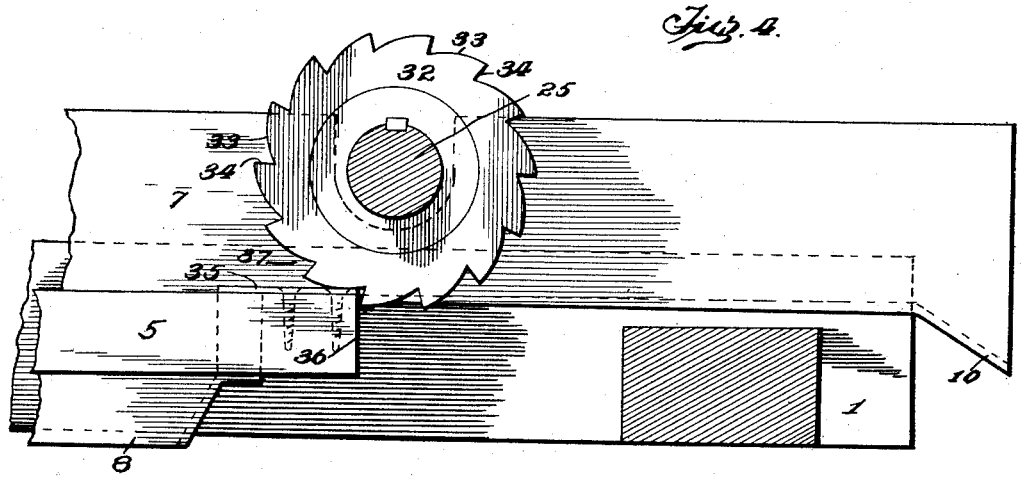
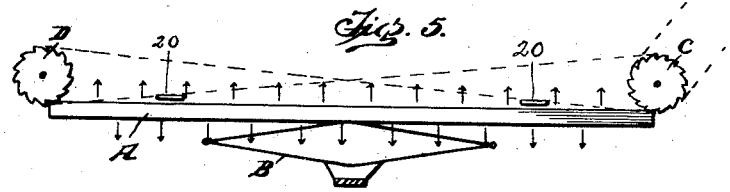

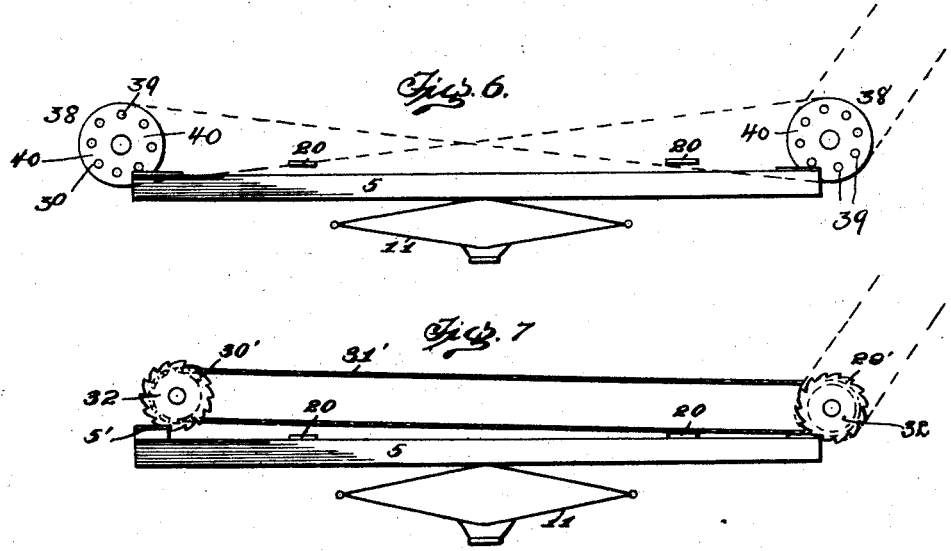

No. 738,485. Patented September 8, 1903.

UNITED STATES PATENT OFFICE.

FRED N. ROGERS, OF DENVER, COLORADO, ROBERT K. HUMPHREY, OF SANTA BARBARA, MEXICO, AND JOHN W. NESMITH, OF DENVER, COLORADO.

VIBRATING SCREEN.

SPECIFICATION forming part of Letters Patent No. 738,485, dated September 8, 1903.

Application filed January 18, 1902. Serial No. 90,343. (No model.)

*To all whom it may concern:*

Be it known that we, FRED N. ROGERS, a resident of Denver, in the county of Arapahoe and State of Colorado, ROBERT K. HUMPHREY, a resident of Santa Barbara, county of Hidalgo, Chihuahua, Mexico, and JOHN W. NESMITH, a resident of Denver, in the county of Arapahoe and State of Colorado, citizens of the United States, have invented certain new and useful Improvements in Vibrating Screens, of which the following is a specification.

Our invention relates to that general class of inclined screens adapted to freely vibrate with an up-and-down movement.

The object of the invention is the provision of an improved and novel screen for screening, sifting, sizing, or separating wet or dry pulp in mining operations or for similar treatment of any material to which screening, sifting, or sizing processes are applicable, which screen, by reason of its peculiar and novel action, will be adapted to automatically clear itself for the prevention of clogging of its screening-surface, thereby obviating the necessity of using independent rappers, knockers, or separate cleaning-brushes or other devices which have been in general use heretofore for the purpose of keeping the screening-surface clear.

Our object is to manipulate the material so as to present an ever-changing face of its particles to the screening-surface, so that when such particles are of proper size their chances for ultimately passing through the screen will be enhanced, thereby increasing the efficiency of the screen.

To the end that our invention may accomplish the foregoing objects and others incidental thereto we provide an inclined screen every portion of which is adapted for free vibration with an up-and-down movement and novel means acting therewith in an improved manner, whereby the screen is moved through a portion of the cycle of its vibration, then freed from such action preparatory to its being abruptly and rapidly returned to its initial position, and suddenly arrested at that point. The screen we have invented, which embodies the principle we have thus broadly enunciated, possesses the function of automatically clearing itself of such particles of material as would have a tendency to lodge in the openings of the screening-surface and as manipulated operates to turn the particles so that they present ever-changing faces to the screen-openings, and thus if the particles are of proper size their chances for ultimately passing the openings will be increased. The screen not only thus automatically clears itself, but is capable of working great quantities of material with high efficiency, thereby obtaining a maximum amount of "fines" from the material subjected to the screening action.

The automatic clearing action of our screen and the progression of the material thereover, as well as the screening operation itself, are accomplished by the provision of certain improved mechanisms, combinations, and correlations of parts and devices, of which some of the forms are described hereinafter, while the novel features and combinations comprehended by the invention are recited in the appended claims.

In the accompanying drawings, Figure 1 is a side elevation; Fig. 2, a plan; Fig. 3, a transverse section on line *x x* of Fig. 2; Fig. 4, a detail of one corner of the screen and the cam-toothed wheel engaging with that corner; Fig. 5, a diagrammatic view illustrating the relative positions and functions of the springs, cam-toothed wheels, and stops; Fig. 6, a detail view illustrating a modified form of device for moving the screen in opposition to the spring action; Fig. 7, a view illustrating how the cam-toothed wheels can be driven by chain-and-sprocket connections.

The machine has an outer frame 1, preferably rectangular in shape, supported at the desired angle of inclination for the screen by underframing 2. In practice we find that it is preferable to place the main frame at an angle of from twenty to thirty degrees; but to enable adjustment to any desired angle this main frame can be moved up and down at either one or both of its ends by suitable means, one form of which is illustrated, comprising a pivotal connection 3 at the lower end with the underframing and an adjustable device 4 at the upper end for elevating that end to bring it to the desired angle of inclination.

Located in the space defined by the main frame 1 is the screen-frame proper, 5, consisting of a suitable rectangular framework supporting the screen 6 in any preferred manner to enable the removal of the screen and replacement by another when desired. To confine the material on the screening-surface and prevent lateral discharge while passing thereover, we equip the frame 5 with the guard-plates 7, while to prevent spreading of the material passing through the screen the depending guard-plate 8 is provided, which is attached to the frame 5. The receiving or upper end of the screen-frame is provided with a suitable plate 9, on which the material to be screened is fed, while the discharge or lower end of the screen-frame is provided with the discharge-plate 10. We may sometimes prefer to use a shoe equipped with two or more screens, and we do not, therefore, in our claims limit ourselves to the use of a single screen.

Disposed in a line running transversely of the screen and located substantially or approximately midway the receiving and discharging ends of the screen are elliptical springs 11 and 12, secured to the frame 5 of the screen at 13. The lower portions of these springs rest on bolsters or blocks 14, sustained by and connected to brackets 15, which have in their upright portions slots 16, through which pass clamping-bolts 17, extending through the side members of the main frame 1. The upper portions of the brackets are extended over the beams of the frame 1 at 18, and a set-screw 19 is provided in each instance, which is threaded through the portion 18 and has a bearing on the top of the side beam of the frame 1. It will be seen that the screen-frame is thus adjustably supported or sustained by the elliptical springs 11 in a yielding manner, while the tension of the springs can be regulated to the desired extent to give the screen the desired tendency to snap back or spring upwardly in an abrupt or sharp manner when released, according to requirements.

For the purpose of limiting the amplitude of the vibration of the screen and rendering same independent of the amplitude of movement of the deflecting means and to suddenly and sharply arrest the upward movement of the screen in an abrupt manner, so as to give it a decided shock, we provide the adjustable stops 20, which we have found in practice desirable to locate at several points on opposite sides of the screen-frame and preferably at least one on each side of the points of support of the springs. These stops are made adjustable in an up-and-down direction in substantially the same manner as the brackets for the springs, but the set-screws 21 for the stops are adapted to bear against the under side of the side pieces of frame 1. The stops are provided with slots 22, through which and through the frame 1 pass clamping-bolts 22'. The lateral portions 20' of the stops overlap the frame 5 of the screen, outside the guard-plates 7, and rubber or leather strips 23 are provided on the frame 5 where the stops strike.

From the foregoing description it will be clear that the screen-frame is movable in up-and-down direction and is yieldingly supported or sustained by springs applied in a line located substantially midway the receiving and discharging ends of the screen, so that the screen is yieldingly balanced throughout its extent, and by utilizing this principle we are enabled to accomplish our objects by the use of but two springs, but when referring in our claims to "springs" or "means" located approximately in a line disposed midway the receiving and discharging ends of the screen we do not limit ourselves to the use of two springs disposed exactly as illustrated and described. Our invention in this respect comprehends, broadly, the utilization of means for abruptly or sharply snapping back or returning the screen to its initial position, whether such means operate on the under side of the screen or on its upper side in opposition to deflecting means for the screen.

The utilization of adjustable stop devices for suddenly arresting the return movement of the screen makes it possible to gage the vibration of the screen to any desired amplitude, ranging from a minute and scarcely perceptible tremble or agitation to a vibration of quite appreciable amplitude.

Above and adjacent the ends of the screen-frame are disposed the transversely-extending shafts 24 and 25, which are suitably journaled in boxes 26 on the main frame 1, which boxes are adjustable longitudinally of said frame 1 by slot-and-bolt connections 27, thereby making it possible to regulate the position of the shafts in relation to the ends of the frame of the screen, the purpose of which will be apparent presently. On one of these shafts is located the drive-pulley 28, to be belted to a suitable sort of power, while on the other ends of the shafts are the fast pulleys 29 and 30, which are directly connected by a crossed belt 31, which induces reverse movements in the shafts. On these shafts are provided cam-toothed wheels 32, and we find it desirable to employ at least four of these cam-toothed wheels, disposed to act with the edges of the four corners of the screen-frame 5, as such disposition permits the use of a comparatively light screen-frame, though it is obvious that it is not essential to the practical operation of the machine to employ this exact number. Indeed, it is quite apparent that our invention is not necessarily restricted to a rectangular or square screen or screen-frame, but that the screen could assume a variety of shapes and could also be of the trommel type. We do not desire to restrict ourselves in our claims to the use of cam-toothed wheels, unless so specified, as other means could be employed to accomplish the deflecting movement obtained thereby, nor unless specified do we limit ourselves to cam-toothed wheels which act on top of the screen, as the springs could be used on top and the cams underneath the screen.

The cam-toothed wheels consist of one or more cam-inclines 33 and abrupt shoulders 34. The wheels are adapted to act on the edges of the screen-frame 5 at the corners, and to prevent wear wear-plates 35 are provided at these points. Referring more particularly to Fig. 4 will give a clear idea of the peculiar and novel manner in which these cam-toothed wheels act on the screen-frame to deflect it against the action of the springs. The edges of the corners of the screen-frame are so related to the cam inclines and teeth that the edges will alternately ride against the cam-inclines and then become completely freed or disengaged therefrom when the upright edge portion 36 of the frame comes into alinement with the shoulder 34. In consequence of this action the screen-frame is first deflected by the cam-incline against the snap-back action of the springs, intensifying the tension on the springs, and before the cycle is completed the screen is released from the deflecting tendency when the shoulder 34 is reached, to be promptly and abruptly reacted on by the springs, which thereupon snap back the screen in an abrupt or sharp manner to its original position. The original or initial position of the screen can be determined either by the stops or by the cam-incline itself if the stops are not adjusted to arrest the amplitude of vibration of the screen short of the amplitude of the throw of the cam-incline. However, if the stops are adjusted to arrest the return movement of the screen before it would reach the depth of the interdental space 37 the screen will be deflected by the succeeding cam-incline as soon as the latter commences to contact therewith. Provision is thus made for regulating the vibration of the screen so that it may be given the greatest possible amplitude, which is the entire depth of the interdental space, or give it lesser amplitude of vibration regulated by the position of the stops. Thus the vibration may be regulated to produce a movement ranging from the depth of the interdental space to a mere trembling motion of the screen. So far as we are aware this feature has never been utilized before and it constitutes an important part of the present invention, for the screen is thereby enabled to treat all kinds of material, whether wet or dry, to screen or size it, as desired, according to the screening-surface employed, ranging from coarse sizing down to the sizing of impalpable powders. Sprocket-wheels 29' and 30' and chains 31' can be employed, if preferred, so as to obtain a vibration of all portions of the screen simultaneously, as illustrated in Fig. 7, where one pair of the cam-toothed wheels 32 will operate on a member 5' on the screen-frame. In this connection we desire ourselves as being understood not to limit our claims to the arrest of the screen by the stops to the exclusion of the deflecting means itself, or vice versa, unless so specified, and, further, not to limit ourselves in our claims when referring to the action of the deflecting means, however described, with the screen as necessarily meaning that such deflecting means acts directly with the edge of the screen itself, as we may use members on the screen of various shapes so related to the deflecting device as to provide alternate deflection of the screen and its free return to its initial position by means adapted to so return it.

In our claims we intend to cover the coaction of the cam-toothed wheels either directly with "members" forming part of the screen-frame or members on said frame.

There is an advantage in having the deflecting means (and by deflecting means we here refer to the cam-toothed wheels) act at a plurality of points on opposite sides of a line located midway the receiving and discharging ends thereof and more particularly toward the end portions of the screen, for the screen then is positively deflected over all of its portions, thus preventing any "dead-screen area" arising from absorption of vibration intended to be distributed over an entire screen from practically a single line of deflecting action. To illustrate how the deflection of the screen can be as well accomplished by means of other than cam-toothed wheels we have shown in Fig. 6 a rotative member (any desired number of which may be employed in substitution for the cam-toothed wheels) comprising a rotative or body part 38 and one or more pins or members 39, projecting from the face thereof, leaving the free intermediary spaces 40. This will act with the corner of the screen or members thereon and accomplish the same results as the cam-toothed wheels.

Our screen while especially designed for screening or sizing either wet or dry pulps is not necessarily limited to such use, but is adaptable for use for the purpose of screening, sifting, bolting, sizing, or separating any material and in any connection to which screening or sifting processes are applicable. In operation, the screen being at the proper angle of inclination, the material is fed onto the upper or receiving plate 9 and caused to pass over the screen-surface partly by the action of gravity and partly by the added motion due to the vibratory action of the screen-surface. The gravity action is an important factor in the screening process in that its tendency is particularly effective in breaking up the mass of material and separating each individual particle from the others as it rolls or flows over the screen-surface, allowing the greatest opportunity for the fines to pass through the openings. The direction of the added motion given the ore particles or other material being operated upon by the peculiar vibratory motion of the screen-surface is of advantage in several ways. First, it is the most effectual direction to impart to the particles that the rejections may not become lodged in the screen-openings, thus destroying the efficiency of the screening-area; secondly, the direction of vibration imparts to the particles a movement least likely to interfere with their passing the openings of the screening-surface if the particles be of proper size; thirdly, the motion added to the mass of particles is in a direction and of such character as to present an ever-changing face of each particle to the screen-surface, enhancing its chances to ultimately pass the openings if the particles are of proper size; fourthly, the added motion given the particles is not in such direction as to unduly hasten the moving of the mass of particles over the screening-surface so that they will not have ample opportunity to be subjected to the screening action. The object of obtaining a vibratory motion of the character set forth and imparting to the screen-surface a decided shock at the terminus of its return movement with a minimum shock at the terminus of its advance movement is to most effectually aid the rejected particles in clearing themselves from the openings in the screening-surface, wherein they are disposed to lodge and clog the screen-area, which clearing action is an automatic one, dependent on the inertia of the particles themselves on the sudden arrest of the screen. The vibrating action keeps the ore "alive" and gives a screening action which is exceedingly rapid.

Fig. 5 illustrates in a diagrammatic manner the motion of the screen and from which, in connection with the following explanation, a clear idea can be obtained of the action on the material. The screen is here represented by A, the spring means or action by B, and the deflecting means by the cams C and D. The arrows indicate the approximate paths of movement of the different portions of the screen. When the screen is deflected by the cams C and E, all portions thereof move in approximately straight paths downward against the action of the spring mechanism B, which supports or sustains the screen. When the deflection downward is abruptly terminated by the screen being freed from the cam-wheels at the abrupt shoulders, the spring mechanism B reacts to snap back the screen, and all portions of the screen then return in straight paths, as indicated by the arrows pointing upward, which paths are substantially perpendicular to the face of the screen, and on the sudden arrest of the return movement the particles of the material passing over the screen continue a short distance by virtue of their inertia, and the screen thus automatically clears itself and prevents clogging by throwing off the rejections, while the character of such action in no wise detracts from the sifting function on such particles as are of proper size to pass the openings of the screen.

Having thus described our invention, what we claim as new, and desire to secure by Letters Patent, is—

1. The combination with an inclined spring-sustained screen freely poised or floated throughout its entire extent, so as to be adapted for vibration as an entirety, of cam-toothed wheels, members on the screen which alternately bear against the teeth of the cam-toothed wheels and snap into the interdental spaces of said cam-toothed wheels during the rotation of the latter, whereby the screen is abruptly and completely freed after being depressed in opposition to the spring action, thereby permitting the tensioned spring mechanism to snap the screen back, and means for arresting the screen when snapped back by the spring mechanism.

2. The combination with an inclined screen, spring-sustained approximately at a line located substantially midway the receiving and discharging ends of the screen and freely poised or floated throughout its entire extent, so as to be adapted for vibration as an entirety, of cam-toothed wheels, members on the screen which alternately bear against the teeth of the cam-toothed wheels and snap into the interdental spaces of said cam-toothed wheels during the rotation of the latter, whereby the screen is abruptly and completely freed after being depressed in opposition to the spring action, thereby permitting the tensioned spring mechanism to snap the screen back, and means for arresting the screen when snapped back by the spring mechanism.

In testimony whereof we have severally signed our names to this specification in each instance in the presence of two subscribing witnesses.

FRED N. ROGERS.
ROBERT K. HUMPHREY.
JOHN W. NESMITH.

Witnesses to signature of Fred N. Rogers:
   ELMER SEAVEY,
   WATTS T. ESTABROOK.

Witnesses to signature of Robert K. Humphrey:
   H. E. ALBRIGHT,
   W. B. ANGLE.

Witnesses to signature of John W. Nesmith:
   W. C. MACDONALD,
   J. M. BIBLE.